US009558657B2

(12) United States Patent
Fowe et al.

(10) Patent No.: US 9,558,657 B2
(45) Date of Patent: Jan. 31, 2017

(54) LANE LEVEL CONGESTION SPLITTING

(71) Applicant: HERE Global B.V., Veldhoven (NL)

(72) Inventors: James Adeyemi Fowe, Evanston, IL (US); Gavril Giurgiu, Chicago, IL (US); Michael Finn, Kildeer, IL (US); Leon Oliver Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/939,028

(22) Filed: Nov. 12, 2015

(65) Prior Publication Data
US 2016/0063857 A1 Mar. 3, 2016

Related U.S. Application Data

(62) Division of application No. 14/208,764, filed on Mar. 13, 2014, now Pat. No. 9,208,682.

(51) Int. Cl.
*G01C 21/34* (2006.01)
*G08G 1/01* (2006.01)

(52) U.S. Cl.
CPC .......... *G08G 1/0112* (2013.01); *G01C 21/3492* (2013.01); *G08G 1/0116* (2013.01); *G08G 1/0129* (2013.01); *G08G 1/0133* (2013.01); *G08G 1/0141* (2013.01)

(58) Field of Classification Search
CPC combination set(s) only.
See application file for complete search history.

(56) References Cited

U.S. PATENT DOCUMENTS

| 6,861,960 | B2 | 3/2005 | Hessing et al. |
| 7,587,186 | B2 | 9/2009 | Duckeck |
| 7,865,304 | B2 | 1/2011 | Gretton et al. |
| 8,116,968 | B2 * | 2/2012 | Jou ........................ G08G 1/048 340/907 |
| 8,248,272 | B2 * | 8/2012 | Arnold .................... G01S 13/42 340/916 |
| 8,560,220 | B2 * | 10/2013 | Gottsch ................. B60W 40/00 701/301 |
| 8,842,182 | B2 * | 9/2014 | Mimeault ................ G08G 1/04 348/149 |
| 8,849,554 | B2 * | 9/2014 | Aubrey .................... G08G 1/00 340/933 |

(Continued)

FOREIGN PATENT DOCUMENTS

| EP | 1022704 A1 | 7/2000 |
| EP | 2166524 A1 | 3/2010 |

(Continued)

*Primary Examiner* — Thomas Tarcza
*Assistant Examiner* — Richard Goldman
(74) *Attorney, Agent, or Firm* — Lempia Summerfield Katz LLC

(57) ABSTRACT

A controller receives probe data from a vehicle traveling on a path segment. The probe data may be collected by a mobile device. The path segment may be a multilane roadway. The controller identifies a first lane of the path segment from the probe data. The controller associated a forked route with the first lane of the path segment. The controller calculates different traffic values for the lanes of the path segment. One traffic value may be calculated directly from speeds derived from the path data. Another traffic value may be calculated by the probe data and a historical relationship.

19 Claims, 10 Drawing Sheets

(56) References Cited

U.S. PATENT DOCUMENTS

| | | | |
|---|---|---|---|
| 8,930,124 B1* | 1/2015 | Ferreira | G08G 1/052 701/117 |
| 2005/0125125 A1* | 6/2005 | Matsumoto | G08G 1/167 701/41 |
| 2006/0031008 A1* | 2/2006 | Kimura | G01C 21/3655 701/437 |
| 2006/0235597 A1* | 10/2006 | Hori | B60Q 1/50 701/96 |
| 2007/0050133 A1* | 3/2007 | Yoshikawa | G01C 21/3658 701/437 |
| 2007/0171095 A1* | 7/2007 | Mochizuki | G08G 1/0104 340/995.13 |
| 2009/0024321 A1* | 1/2009 | Bando | G01C 21/36 701/414 |
| 2009/0055095 A1* | 2/2009 | Urban | B60W 40/02 701/301 |
| 2010/0161192 A1* | 6/2010 | Nara | B60W 10/06 701/70 |
| 2011/0071753 A1* | 3/2011 | Chu | G01C 21/3658 701/533 |
| 2011/0276257 A1* | 11/2011 | Zaitsu | G08G 1/0104 701/117 |
| 2012/0316765 A1* | 12/2012 | Marko | G08G 1/0112 701/119 |
| 2013/0275033 A1* | 10/2013 | Bastiaensen | G01C 21/26 701/119 |
| 2013/0282264 A1* | 10/2013 | Bastiaensen | G01C 21/3492 701/119 |
| 2013/0289862 A1* | 10/2013 | Chapman | G01C 21/3691 701/118 |
| 2014/0236473 A1* | 8/2014 | Kondo | G01C 21/3647 701/400 |
| 2014/0297181 A1* | 10/2014 | Kondo | G08G 1/09626 701/532 |
| 2014/0350837 A1* | 11/2014 | Galbas | B60W 30/09 701/301 |
| 2015/0262480 A1* | 9/2015 | Fowe | G08G 1/0112 701/117 |

FOREIGN PATENT DOCUMENTS

| | | |
|---|---|---|
| EP | 2219167 B1 | 1/2012 |
| EP | 2442291 B1 | 4/2013 |
| WO | WO2008083743 A1 | 7/2008 |
| WO | WO2011079724 A1 | 7/2011 |
| WO | WO2011085421 A2 | 7/2011 |

* cited by examiner

LANE LEVEL CONGESTION SPLITTING

This application is a divisional under 35 U.S.C. §121 and 37 C.F.R. §1.53(b) of U.S. patent application Ser. No. 14/208,764 filed Mar. 13, 2014, the disclosure of which is incorporated herein by reference in its entirety.

FIELD

The following disclosure relates to the designation of traffic lanes for a multi-lane path in traffic data, or more particularly, traffic speed reports or predictions based on the designation of traffic lanes for a multi-lane path in traffic data.

BACKGROUND

Traffic Message Channel (TMC) and other traffic services deliver traffic information to customers. Traffic incidents and traffic flow are reported through broadcasts. Traffic delays may be caused by one or more of congestion, construction, accidents, special events (e.g., concerts, sporting events, festivals), weather conditions (e.g., rain, snow, tornado), and so on.

In some areas, broadcast messages contain up-to-the-minute reports of traffic and road condition information. These systems broadcast the traffic data over traffic message channels on a continuous, periodic, or frequently occurring basis. Traffic message receivers decode the data and provide up-to-the-minute reports of traffic and road conditions.

While the reports of traffic are useful, traffic incidents and traffic flow may be averaged across segments of a section of the road, which may not accurately reflect the actual traffic conditions. Challenges remain in the development of more precise reporting of traffic conditions.

SUMMARY

In one embodiment, a controller receives probe data from a vehicle traveling on a path segment. The probe data may be collected by a mobile device. The path segment may be a multilane roadway. The controller identifies a first lane of the path segment from the probe data. The controller associated a forked route with the first lane of the path segment. The controller calculates different traffic values for the lanes of the path segment. One traffic value may be calculated directly from speeds derived from the path data. Another traffic value may be calculated by the probe data and a historical relationship.

BRIEF DESCRIPTION OF THE DRAWINGS

Exemplary embodiments of the present invention are described herein with reference to the following drawings.

DETAILED DESCRIPTION

Road traffic information may be received from traffic providers in real time or with a short time delay and may be reported using traffic message channel (TMC) or another addressing scheme to map traffic conditions to path segments. The term TMC may refer to the traffic reporting format or protocol, or the term TMC may refer to a specific path segment. The TMC may include a global identification value that universally identifies the path segment.

The traffic conditions for a path segment may be determined by tracking probes (e.g., vehicles with position enabled devices). The traffic conditions may be calculated using average speed, for example, as calculated from the entry and exit times of a probe as it travels the path segment and the length of the path segment. The resulting average speed is applied uniformly as the traffic condition for the entire path segment.

However, the path segment may include multiple traffic conditions. For example, depending on the length of the path segment, the traffic near the beginning of the path segment may be at one speed, and the traffic near the end of the path segment may be at another speed. In another example, the traffic condition may vary between lanes. An obstacle or another traffic incident may impede traffic in one lane but not in another lane. An exit lane may experience congestion because of traffic backing up at the exit or because of a traffic condition on the downstream path segment connected to the exit lane.

The path segment may be divided according to an offset location. The offset location may divide the path segment be in the longitudinal direction of the path segment (e.g., with traffic) into multiple lanes. The offset location may divide the path segment in a direction perpendicular to the longitudinal direction of the path segment. The offset location splits the path segment into sections, which may be encoded with independent congestion levels and illustrated as having different congestion levels. For example, the sections of the path segment may be illustrated in different colors on a map.

Figure 1:
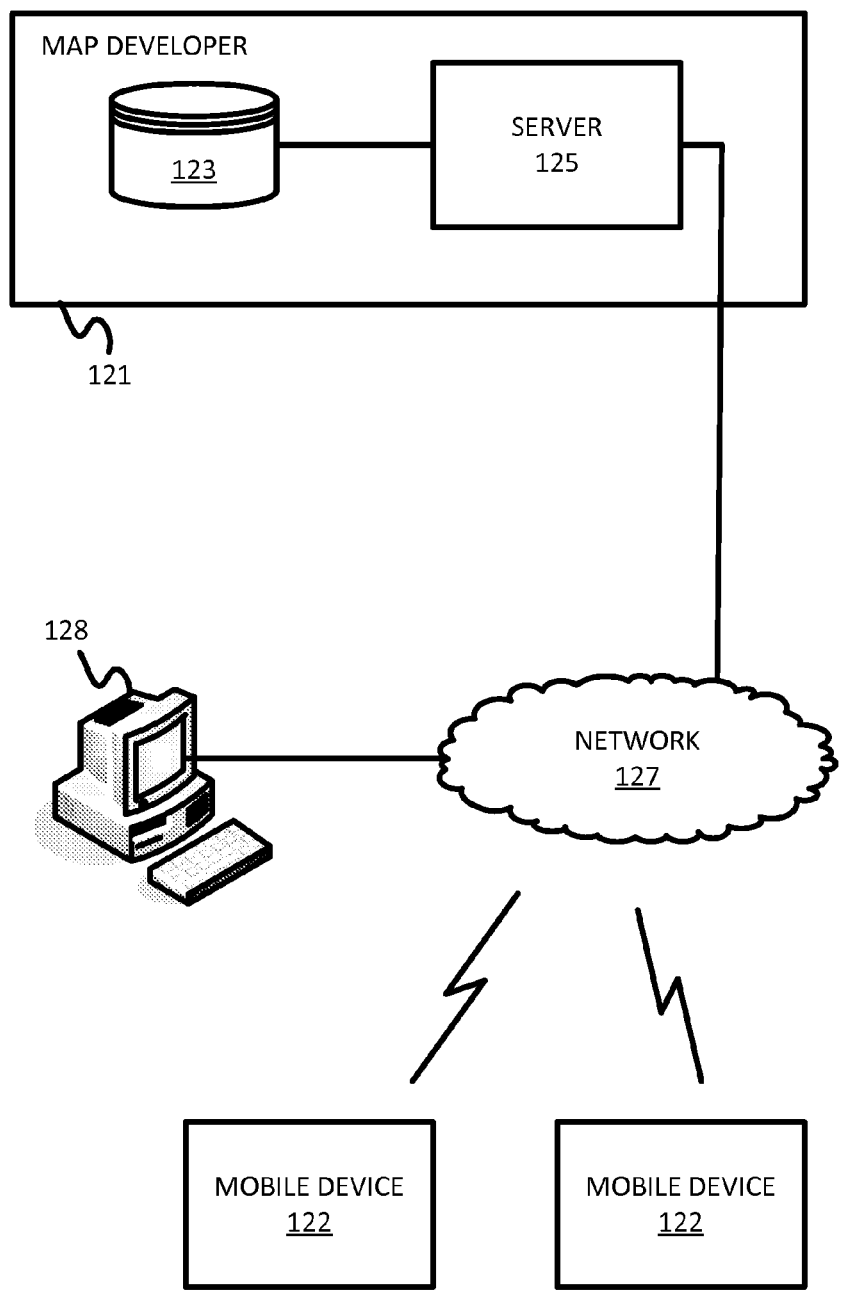
FIG. 1 illustrates an example system for lane level congestion splitting.

FIG. 1 illustrates an example system 120 for lane level congestion splitting. The system 120 includes a developer system 121, one or more mobile devices 122, a workstation 128, and a network 127. Additional, different, or fewer components may be provided. For example, many mobile devices 122 and/or workstations 128 connect with the network 127. The developer system 121 includes a server 125 and a database 123. The developer system 121 may include computer systems and networks of a system operator.

The mobile device 122 may include a probe device (e.g., Global Positioning System (GPS)) for determining the geographic position of the mobile device 122. The mobile device 122 may generate probe data that describes the geographic position of the mobile device 122. When the mobile device 122 is traveling in a vehicle, the probe data describes the geographic position of the vehicle, and when the mobile device 122 is carried by a person, the probe data describes the geographic position of the person.

The server 125 may receive the probe data from one or more mobile devices 122, which may be traveling in vehicles along a road represented by a path segment. The server 125 may analyze the probe data to identify a portion of the path segment that corresponds to the current position of the mobile device 122. The portion of the path segment may be a particular lane. In one example, the server 125 may compare the current position of the mobile device 122 to one or more stored boundary lines between the lanes of the path segments to determine the lane traveled by the mobile device 122.

In one example, the server 125 may compare recent sets of probe data to recent measurements to determine the lane traveled by the mobile device 122 (e.g., whether the current probe measurement walls within a left cluster of probe data points, a center cluster of probe data points, or a right cluster of probe data points). The recent measurements may be previous probe measurements from the mobile device 122. In addition or in the alternative, the recent measurements may be generated by another speed data collection device such as a camera, traffic sensors, infrared sensors, wheel sensors, or another traffic collection device.

The database 123, or a memory of the server 125, may store data indicative of a path network made of path segments. Some of the path segments may be associated with a forked route that is associated with a particular lane of a path segment. For example, on an expressway, a right lane may be an exit lane that leads to an exit ramp. The path network includes a node that connects the exit lane and the exit ramp.

Based on probe data for the exit lane, the server 125 generates a first traffic value that describes the speed of travel on the exit lane. Based on probe data for another lane, the server 125 generates a second traffic value that describes the speed of travel on the other lane. The first traffic value may be interpreted as a first color, shading, or alphanumeric label for the speed of travel on the exit lane, and the second traffic value may be interpreted to a second color, shading, or alphanumeric label for the speed of travel on the other lane.

The traffic values may be based on real time data, historical data, or a combination of real time data and historical data. When the server 125 receives real time data for a lane, the traffic value may be based solely on the real time data. When the server 125 does not receive real time data for a lane, the traffic value may be based on historical data for a time interval corresponding to the current time. In one example, the server 125 may receive real time data for one lane of a path segment but no real time data for a second lane of the path segment. The server 125 may calculate an estimation of the traffic value of the second lane based on real time data for the first lane and historical data for both lanes. For example, a historical relationship or ratio of the traffic between the first lane and the second lane is applied to the real time data for the first lane to estimate a current traffic value for the second lane.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors as a probe or a positioning system built or embedded into or within the interior of the mobile device 122. The mobile device 122 receives location data for geographic position from the positioning system.

The optional workstation 128 is a general purpose computer including programming specialized for the following embodiments. For example, the workstation 128 may receive user inputs for defining geographic boundaries for the lanes of the path segment. The workstation 128 may receive user inputs for manually defining the speed ranges for the color, shading, or alphanumeric labels for the lanes of the path segment.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components. The computing resources may be divided between the server 125 and the mobile device 122. In some embodiments, the server 125 performs a majority of the processing. In other embodiments, the mobile device 122 or the workstation 128 performs a majority of the processing. In addition, the processing is divided substantially evenly between the server 125 and the mobile device 122 or workstation 128.

Figure 2:
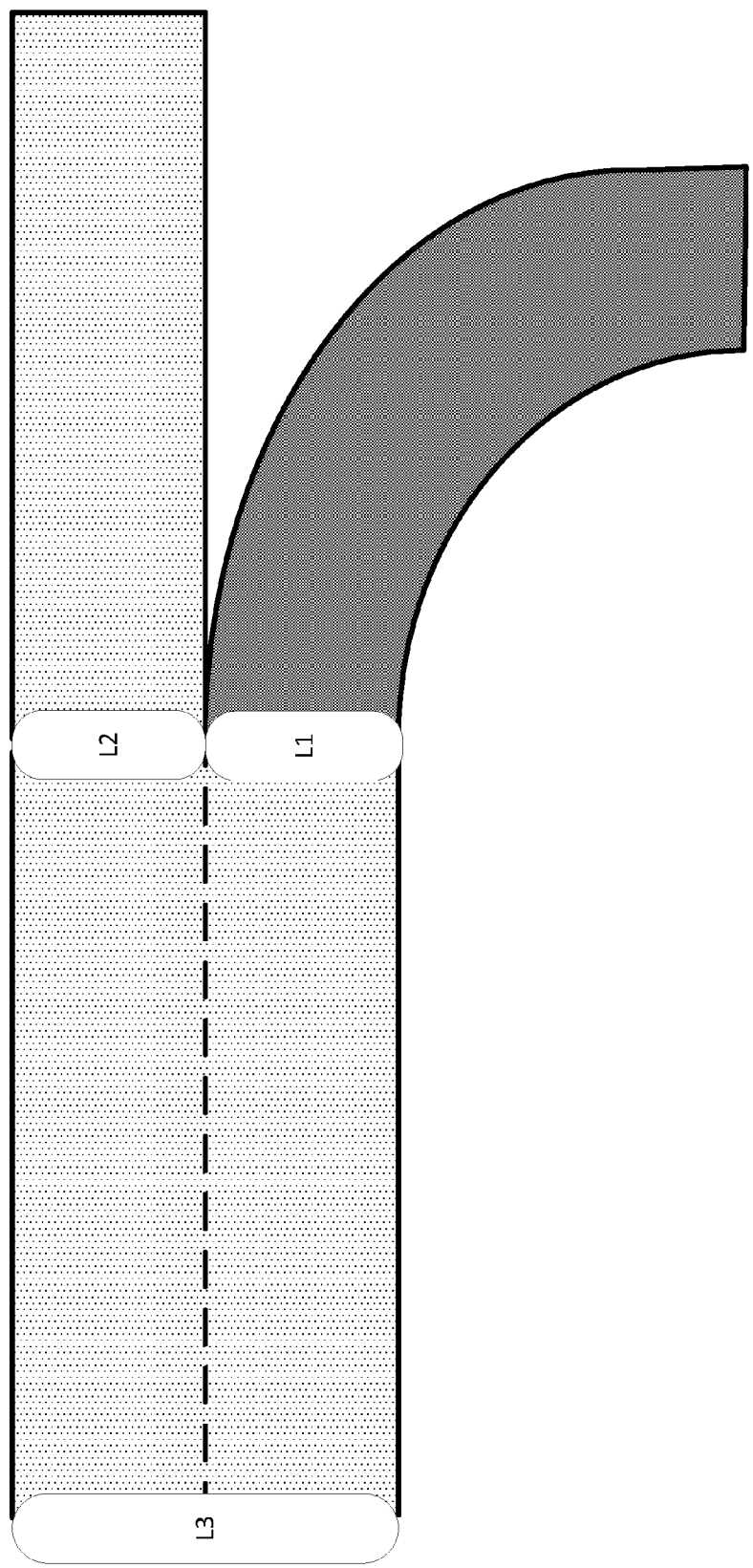
FIG. 2 illustrates example path segments including multiple lanes.

FIG. 2 illustrates an example of path segments, or links, including multiple lanes. A path segment L3 connects with path segments L2 and L1 at a fork. FIG. 2 illustrates a scenario in which traffic is backing up on the exit ramp of path segment L1. However, path segment L3 is illustrated with low traffic (light shading, or a first color) across both lanes because a single traffic condition is used for path segment L3. In practice, the traffic condition of path segment L1 may be affecting traffic flow in the right lane of path segment L1, but because the average of all probes (those traveling in both the left lane and the right lane) defines the traffic condition, the traffic condition represented for path segment L1 may be inaccurate.

Figure 3:
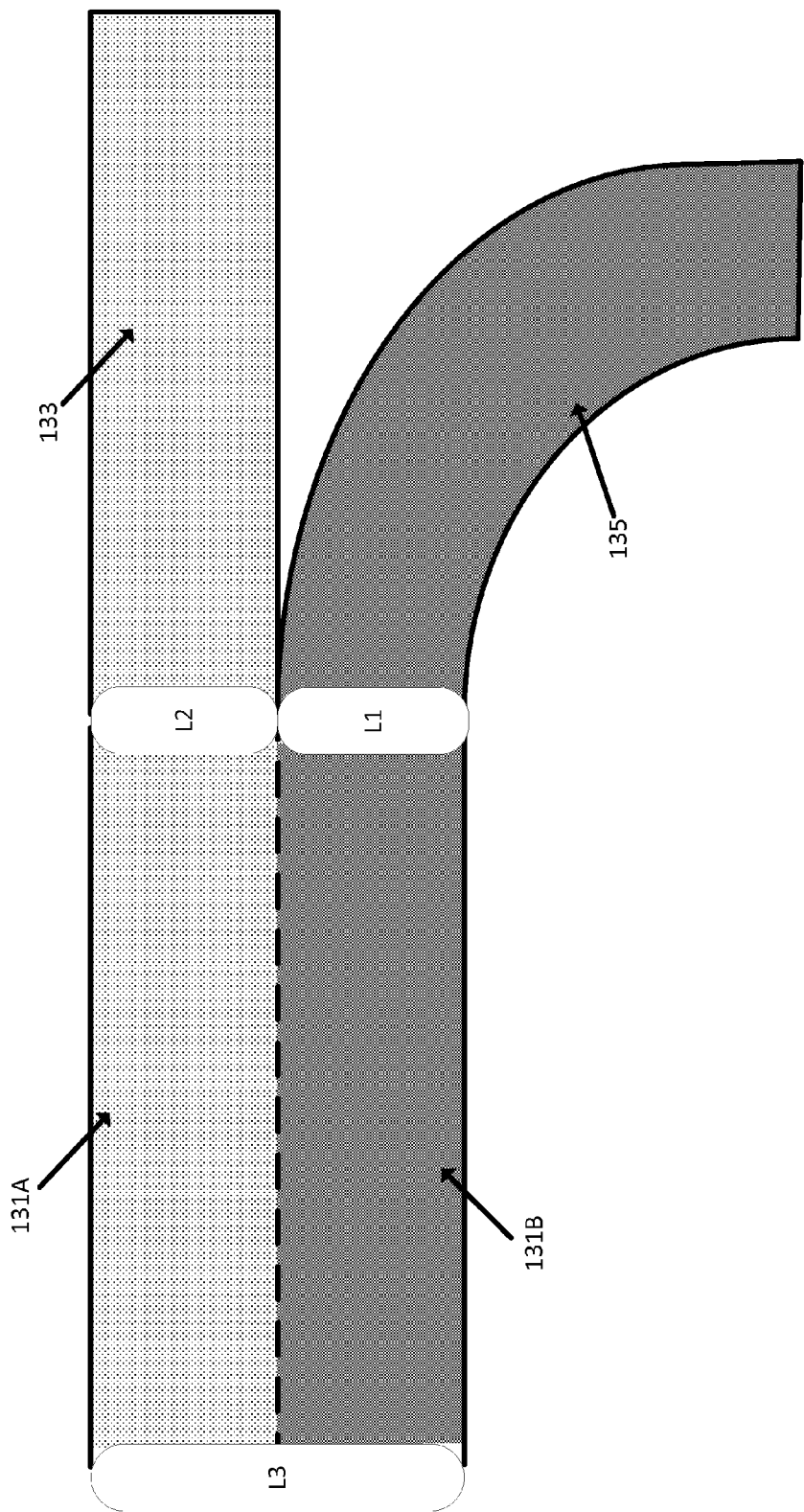
FIG. 3 illustrates traffic condition encoding using the example of FIG. 2.

FIG. 3 illustrates lane splitting for traffic condition encoding using the example of FIG. 2. The path segment L3 includes a left lane 131A and a right lane 131B. The left lane 131A is connected to path segment L2 including lane 133, and the right lane 131*b* is connected to path segment L1 including lane 135. The traffic condition of the left lane 131A may be calculated from the entry time and exit time of one or more probes that travel the left lane 131A and the length of the path segment L3. The traffic condition of the right lane 131B may be calculated from the entry time and exit time of one or more probes that travel the right lane 131B and the length of the path segment L1. The average speeds of multiple probes may be averaged for the traffic condition for the left lane 131A and the right lane 131B.

Because the average speeds for left lane 131A and right lane 131B are calculated separately, individual traffic values may be determined for each lane. The traffic value may correspond to an estimated speed range. For example, a traffic value of 3 may correspond to an estimated speed range of 41 miles per hour or higher, a traffic value of 2 may correspond to an estimated speed range of 30-40 miles per hour, a traffic value of 1 may correspond to a predicted speed range of 17-29 miles per hour, and a traffic value of 0 may correspond to an estimated speed range of 16 miles per hour or less. The traffic value may be calculated based on a statistical distribution. For example, a traffic value of 0 may correspond to an average speed value near a historical mean, such as within one standard deviation of the historical mean, a traffic value of 1 may correspond to an average value higher than the historical mean, such as within two standard deviations of the mean, and a traffic value of −1 may correspond to an average value lower than the historical mean, such as within two standard deviations of the historical mean.

A graphical indicator may be applied to individual path segments and individual portions of path segments (e.g., the left lane 131A and the right lane 131B). The graphical indicators may be different colors, shadings, text labels, or other indicators of traffic levels. Example shadings are shown in FIG. 3. The server 125 may be configured to access a lookup table that associates traffic values to graphic indicators (e.g., a traffic value of 3 corresponds to green, a traffic value of 2 corresponds to yellow, and a traffic value of 1 corresponds to red).

Because the left lane 131A and the right lane 131B are encoded with traffic value independently, the left lane 131A and the right lane 131B may be assigned different graphical indicators. Thus, the graphical indicator for left lane 131A is arranged adjacent to the graphical indicator for left lane 131B and in parallel to represent the path segment 131 in the same direction.

As an alternative to color, the graphical indicator may be a size of the path (e.g., high traffic areas are shown constricted on the map), the graphical indicator may be a vehicle animation (e.g., vehicles are shown in animation at a speed proportional to the predicted speed), the graphical indicator may be a speed value shown on the map with text, or the graphical indicator may be shown in another fashion.

Figure 4:
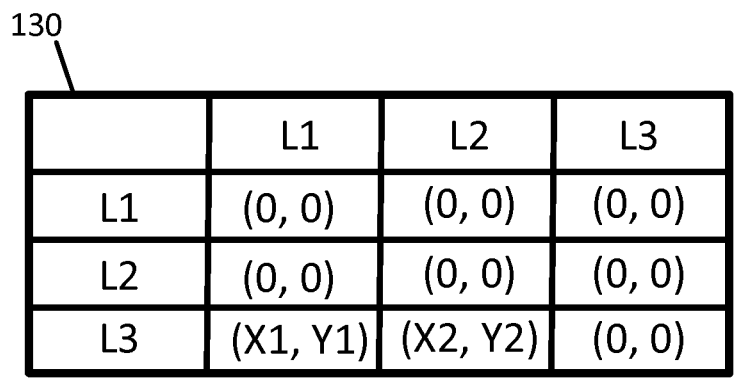
FIG. 4 illustrates an example matrix for the path segments of FIG. 2.

FIG. 4 illustrates an example matrix 130 for the path segments of FIG. 2. The matrix may be an origin-destination (OD) matrix that associates possible destinations on one axis (e.g., the horizontal axis) and possible origins on the other axis (e.g., the vertical axis). The matrix 130 may include a cell for each combination of possible path segments. Cells in which the corresponding combination of path segments do not intersect may include a zero value or a null value (e.g., (0,0)). Cells in which the corresponding combination of path segments intersect or associated by a node include nonzero values.

The cells may include an average speed for the probe paths, or data points for speed measurements for the path. In addition or in the alternative, the cells may include a quantity of probe paths measurements. The average speeds of the probe paths and the quantity of the probe paths may be real-time data, historical data, or both. The matrix 130 may include a flag for each cell that indicates whether the data is real-time data or historical data. Alternatively, the matrix 130 may include only historical data and real-time is stored outside of the matrix 130 as the real time data is received.

FIG. 4 corresponds to the paths illustrated in FIG. 3. The matrix 130 illustrates zero values that illustrate when no connection exists between paths. The matrix 130 illustrates nonzero values for the path between path segment L3 and path segment L2 and the path between the segment L3 and path segment L1. Each nonzero value in the matrix 130 indicates a spatial origin and spatial destinations. Each nonzero value in the matrix 130, which may be referred to as an OD pair, may have no temporal characteristics and indicate that indicate there is at least one contiguous path geometry with correct restrictions on driving maneuvers between the OD pairs.

The matrix 130 includes a count value (X1) for the quantity of measurements and the average speed value (Y1) for the path between the segment L3 and path segment L1. The matrix 130 includes a count value (X2) for the quantity of measurements and the average speed value (Y2) for the path between path segment L3 and path segment L2. The measurements may be referred to as probe paths such that each probe path is a sequential set of GPS points for the same vehicle with increasing timestamps. The average speed value of a probe path may be calculated from the distance covered divided by the travel time (e.g., difference in minimum timestamp and maximum timestamp).

The matrix 130 may be associated with a specific time epoch, or the matrix 130 may include multiple layers or divisions for multiple time epochs. The time epoch corresponds to a time of day, day of week, and/or day of the year. The size of the repeating time epochs may be configurable by the developer. Example sizes include 15 minutes, 30 minutes, 1 hour, or another value. Example time epochs include 5:00 pm-5:15 pm on a weekday, 10:00 am-11:00 am on a Saturday, and 2:00 pm-4:00 pm on the day before Thanksgiving. In the example of 15 minute epochs, the speed data may be formatted into a 96-dimensional vector for each cell of the matrix 130, in which each of the 96 components describe speed data for a different 15 minute epoch. The size of matrix 130 is a function of the size, or quantity, of the time epochs.

Consider an example for matrix 130 in which the O-D pair for L3 to L1 is (X1, Y1)=(17, 11), which indicates 17 probe paths with an average speed of 11 kilometer per hour (kph), and the O-D pair for L3 to L2 indicates 5 probe paths with an average speed of 18 kph. As shown in the region of interest on the map in FIG. 3, a traffic condition where L3 reports congestion but L2 reports no congestion could result from an exit ramp at L1 being blocked. The matrix 130 indicates that L3 to L1 has a higher traffic volume and lower average speed than the link L3 to L2. For the link the L3 to L1, the traffic volume is relative to 17 probe paths and the average speed is 11 kph, which may be colored red. For the link L3 to L2, the traffic volume is relative to 5 probe paths and the average speed is about 18 kph, which may be colored yellow.

The matrix 130 may include historical data, real time data, or a combination of historical and real time data. When the matrix 130 includes only historical data, real time data may be received and analyzed by the server 125. In one example, the server 125 may compare the quantity and/or quality of the real time data to determine whether the matrix 130 should be used to estimate the traffic value. For example, the server 125 may store a reliability threshold for the real time data. Examples for the reliability threshold may include 1, 2, 10, or 100 measured probe paths.

When the number of probe paths, which may be limited to probe paths during a specific time epoch for a specific lane of the path segment, exceeds the reliability threshold, the traffic value for the lane is calculated from the real time data. However, when the number of probe paths does not exceed the reliability threshold, the server 125 calculates the traffic value for the lane based on historical data for the lanes of the path segment and a historical relationship between the lanes. The historical relationship may be a ratio of the historical traffic levels on one lane of the path segment to the historical traffic level on another lane of the path segment. The historical relationship may include multiple components (e.g., a first component describes the ratio of lane A to lane B, a second component describes the ratio of lane B to lane C, and third component describes the ratio of lane C to lane A).

Returning to the example illustrated by FIG. 4, the matrix 130 may include historical data only. The server 125 receives measured probe paths for the current time epoch. The measured probe paths may be sufficient to describe the traffic from L3 to L1. In other words, the number of probe paths from L3 to L1 exceeds the reliability threshold. However, the measured probe paths may not sufficiently describe the traffic from L3 to L2. In other words, the number of probe paths from L3 to L2 does not exceed the reliability threshold.

The server 125 accesses matrix 130, or a portion of matrix 130, that is associated with a historical data for the current time epoch. The server 125 may access or calculate a ratio between the traffic levels on L2 to the traffic levels on L1. The server 125 may multiply the ratio for L2 to L1 (HR) by the measured traffic level on L1 ($TV_1$) to calculate the current traffic level estimate on L2 ($TVE_2$) according to Equation 1.

$$TVE_2 = HR * TV_1 \qquad \text{Eq. 1}$$

Figure 5:
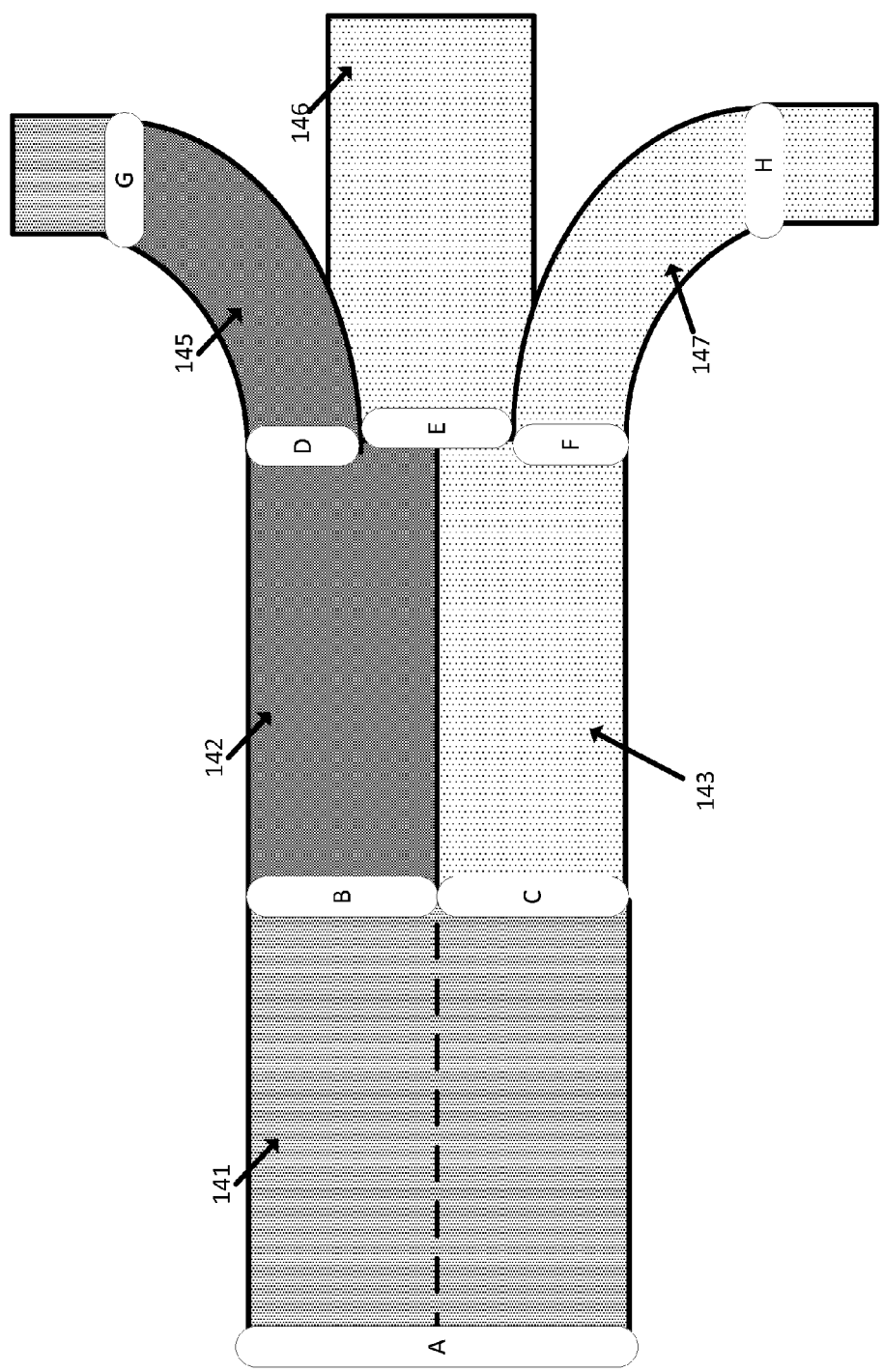
FIG. 5 illustrates example path segments including multiple lanes.

FIG. 5 illustrates example path segments including multiple lanes. The pathway may include a two lane path that splits into three paths. Portions of the path may be encoded for a single traffic value (no distinction between lanes), portions of the path may be encoded for two traffic values (distinction between lanes), and/or portions of the path may be encoded for three traffic values (distinction between resulting ramps).

A path segment A may include a single graphical portion 141 that represents the entire width of the path. The path segment A is connected to path segments B and C, including distinct graphical portions 142 and 143 respectively, which represent different lanes in the width of the path. The path segment B is connected to path segments D including graphical portion 145 and path segment E including graphical portion 146. The path segment C is also connected to path segment E. Thus, path segment E is associated with multiple upstream path segments. The path segment C is connected to path segment F, which includes graphical portions 147. Downstream path segments G and H are also illustrated.

The example illustrated in FIG. 5 includes three graphical indicators representing three traffic levels. Graphical portion 141 includes a graphical indicator (e.g., medium traffic level) that represents the average of the probe paths for path segment A. Traffic is slowed on the exit ramp for path segment D, and traffic is backed up into path segment B. Thus, graphical portions 142 and 145 indicate a graphical indicator for high traffic level (low speed). In path segments E and F, traffic is moving freely. Thus, graphical portions 143, 146, and 147 indicate a graphical indicator for a low traffic level (high speed).

Figure 6:
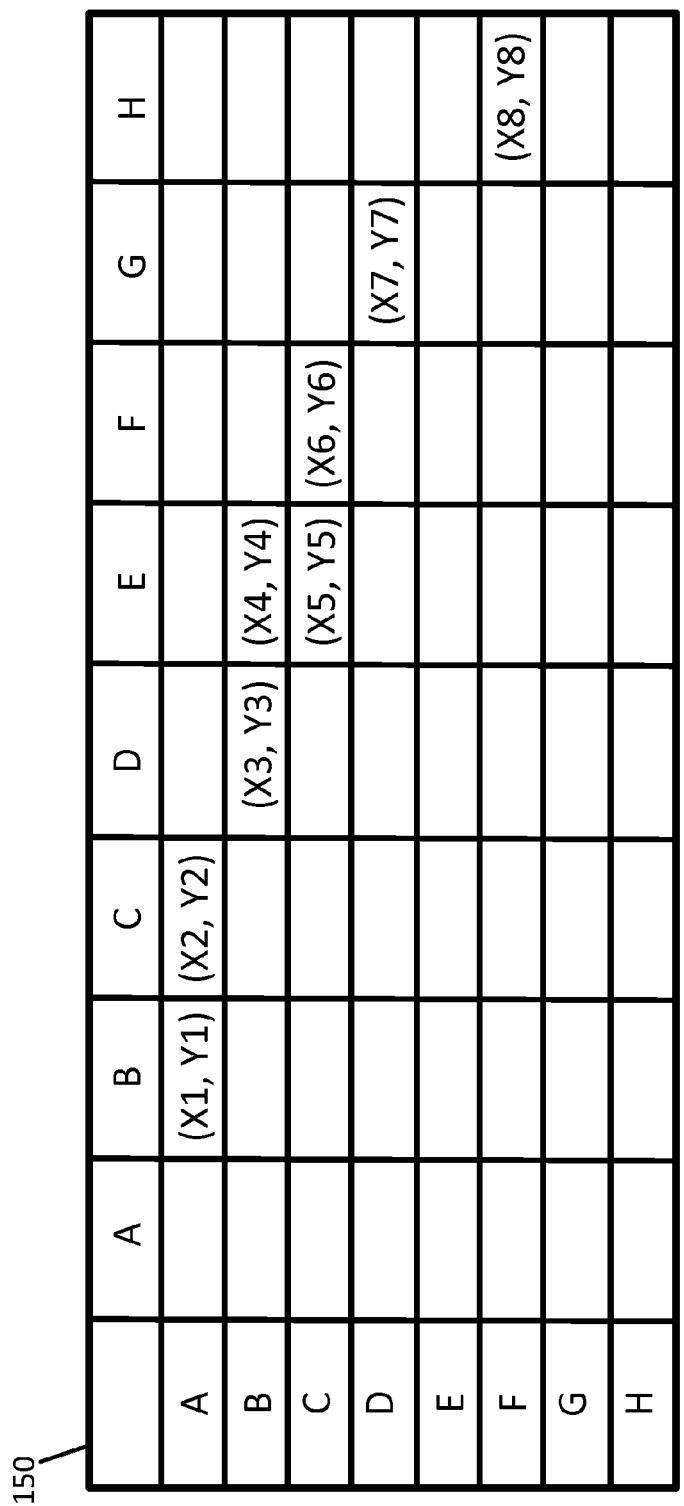
FIG. 6 illustrates an example matrix for the path segments of FIG. 5.

FIG. 6 illustrates an example matrix 150 for the path segments of FIG. 5. The server 125 may be configured to compare the data arrangement of the matrix 150 to identify lane distinctions. For example, a row with more than one nonzero cell indicates that the corresponding path segment is connected to more than one downstream path segment and may be subject to different traffic conditions in the different lanes. In matrix 150 the rows corresponding to path segments A, B, and C included multiple nonzero cells. Similarly, a column with more than one nonzero cell indicates that multiple lanes or path segments feed a particular downstream path segment. In matrix 150, the column corresponding to path segment E includes more than one nonzero column because both lanes (path segments B and C) are connected to path segment E. The row and column arrangement may be reversed depending on the layout of the matrix 150.

The server 125 may access a lookup table such as the matrix 150 based on a geographic position, which may be the geographic position of the mobile device 122. The server 125 identifies a row or column vector in the lookup table that corresponds to the path segment and determines whether a number of components, or nonzero components, of the vector exceeds one. When the number of components exceeds one, the server 125 determines that the path segment is a multi-lane segment.

The server 125 may compare the matrix 150 to one or more predetermined patterns or templates. The templates may include a template for identifying multiple nonzero cells in a row or column. The server 125 identifies a match between the matrix 150 and a template to determine that traffic lane differentiation can be performed on the path network. In other words, the server 125 may generate the map include the graphical indicators for parallel lanes when the matrix 150 matches a predetermined template.

The size of the matrix 150 is a function of the number of variables or distinctions made within the traffic data or measured probe paths. For example, the matrix 150 may have a depth or number of layers depending on the a space complexity is a function including a number of geographic regions (r), a number of time divisions (n), and a number of time epochs (t) in each division. Time divisions techniques include, daily (n=7), day of the year (n=365), weekday/weekend (n=2), or holiday/non-holiday (n=2). The space complexity function defines the quantity of layers (Q) of the matrix 150 according to Equation 2.

$$Q = r * t * n \qquad \text{Eq. 2}$$

Figure 7:
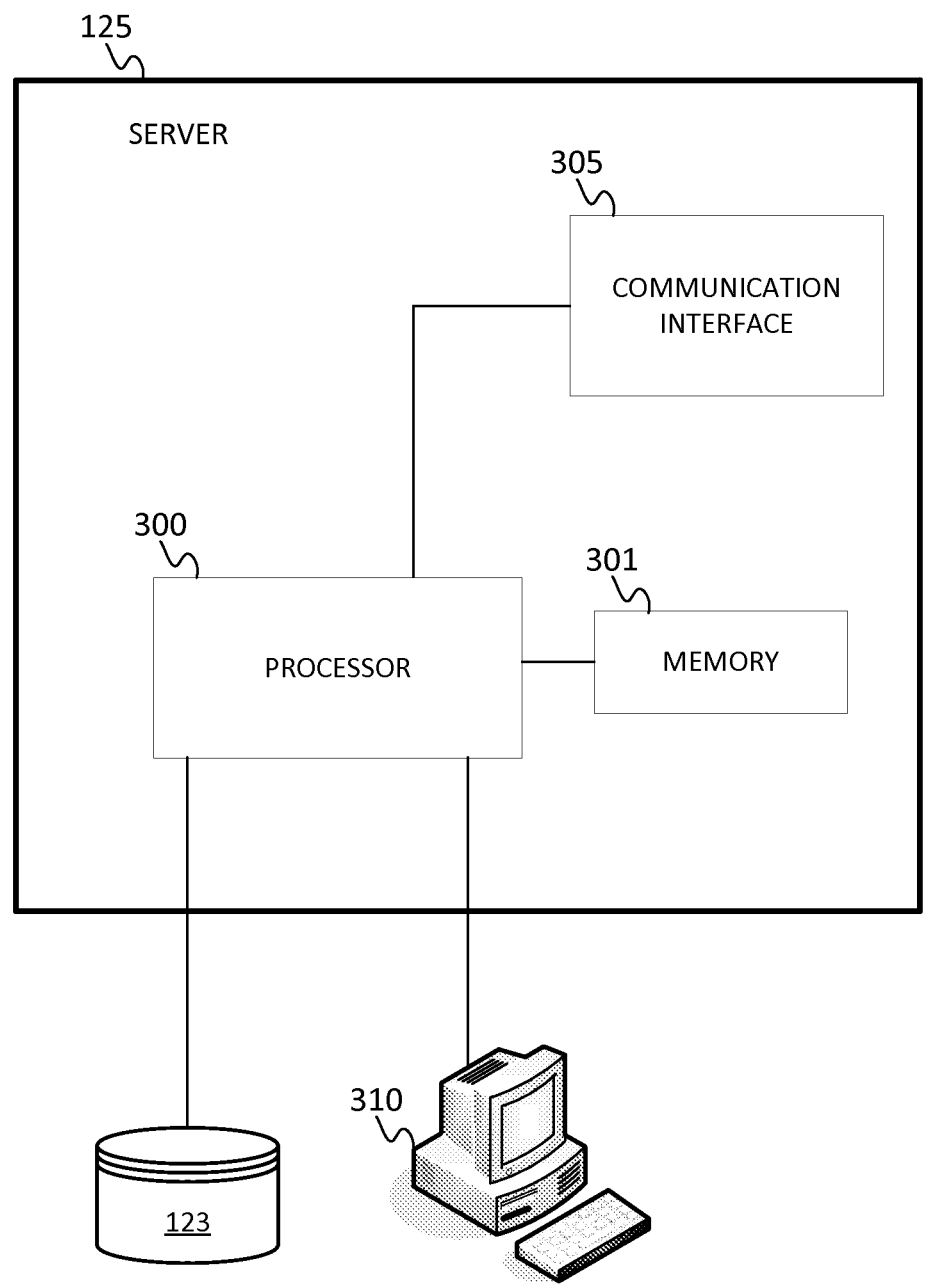
FIG. 7 illustrates an exemplary server of the system of FIG. 1.
Figure 8:
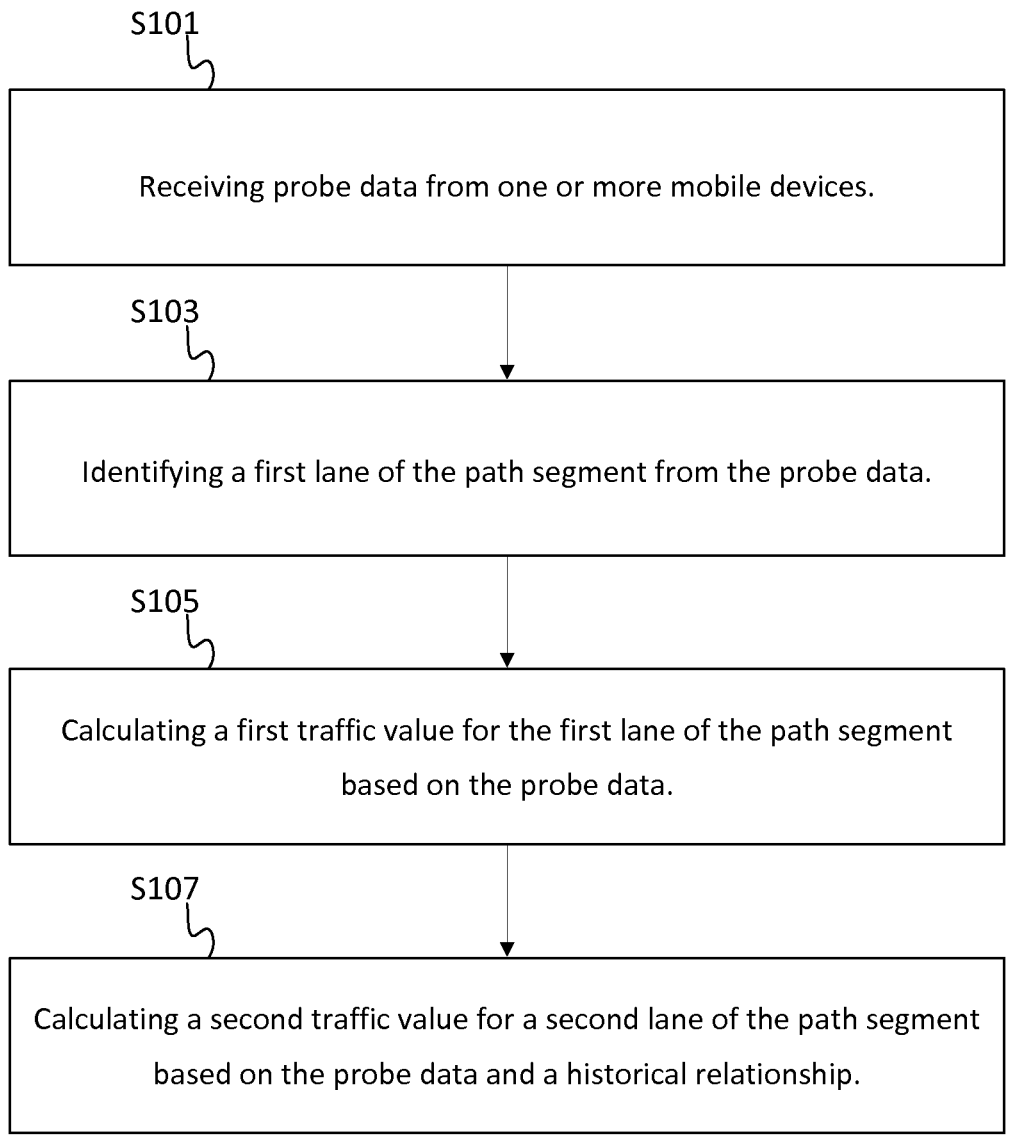
FIG. 8 illustrates example flowchart for lane level congestion splitting.

FIG. 7 illustrates an exemplary server of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122. Additional, different, or fewer components may be included. FIG. 8 illustrates an example flowchart for lane level congestion splitting. The acts of FIG. 8 may be performed by the server 125 or another device. Additional, different, or fewer acts may be provided.

At act S101, the communication interface 305 receives probe data from one or more mobile devices. The mobile devices may be traveling along a path segments. The mobile devices may be navigation devices or cellular phones. The probe data may be collected by a mobile application. The map application may be a navigation application that provides routing directions based on a current position of the mobile device and an inputted destination. The map application may provide maps and points of interest at locations shown on the maps. The probe data may describe current and past positions of the mobile devices.

At act S103, the processor 300 is configured to identify a first lane of the path segment from the probe data. The processor 300 may compare geographic locations in the probe data to a map of path segments. The processor 300 may select the path segment that is closest to the probe data. Alternatively, the path segment may be assigned a range of geographic locations.

At act S105, the processor 300 calculates a traffic value for the first lane of the path segment based on the probe data. The traffic value may be a speed calculated from the geographic locations of the probe data. The traffic value may be an average speed calculated from the time the mobile device enters the path segment and exits the path segment. The traffic value may be calculated from two sequential position data points.

At act S107, the processor 300 calculates a traffic value for a second lane of the path segment based on the probe data and a historical relationship. For example, the processor 300 may access a ratio for previously recorded speeds on the second lane to previously recorded speeds on the first lane. The historical relationship may be indexed by time epoch. The historical relationship provides an estimation of traffic on one lane based on traffic on another lane.

The processor 300 may determine whether or not to perform act S107. For example, when the probe data includes less than a predetermined number of probe paths for the second land of the path segment, then the processor 300 performs act S107. When the probe data includes at least the predetermined number of probe paths for the second land of the path segment, then the processor 300 omits act S107 and calculates the traffic value for the second lane based on the probe paths.

The processor may perform act S107 for multiple lanes. That is, the processor 300 is configured to calculate a historic ratio between the first lane and the second lane and a historic ratio between a third lane and the second lane. The processor 300 calculates a first estimate for the traffic value for the second lane based on the historic ratio between the first lane and the second lane and calculates a second estimate for the traffic value for the second lane based on the historic ratio between the second lane and the third lane. The processor 300 may average the first estimate and the second estimate to determine the traffic value for the second lane.

Figure 9:
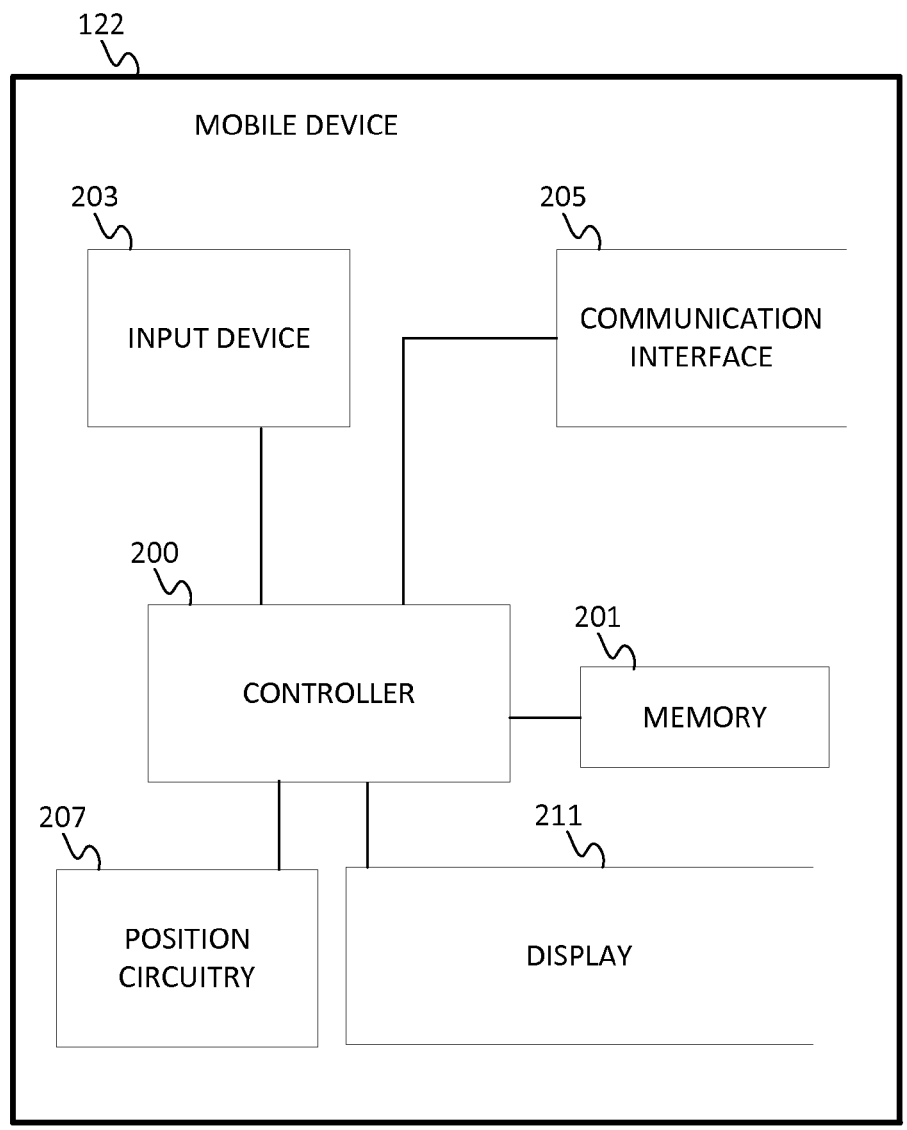
FIG. 9 illustrates an exemplary mobile device of the system of FIG. 1.
Figure 10:
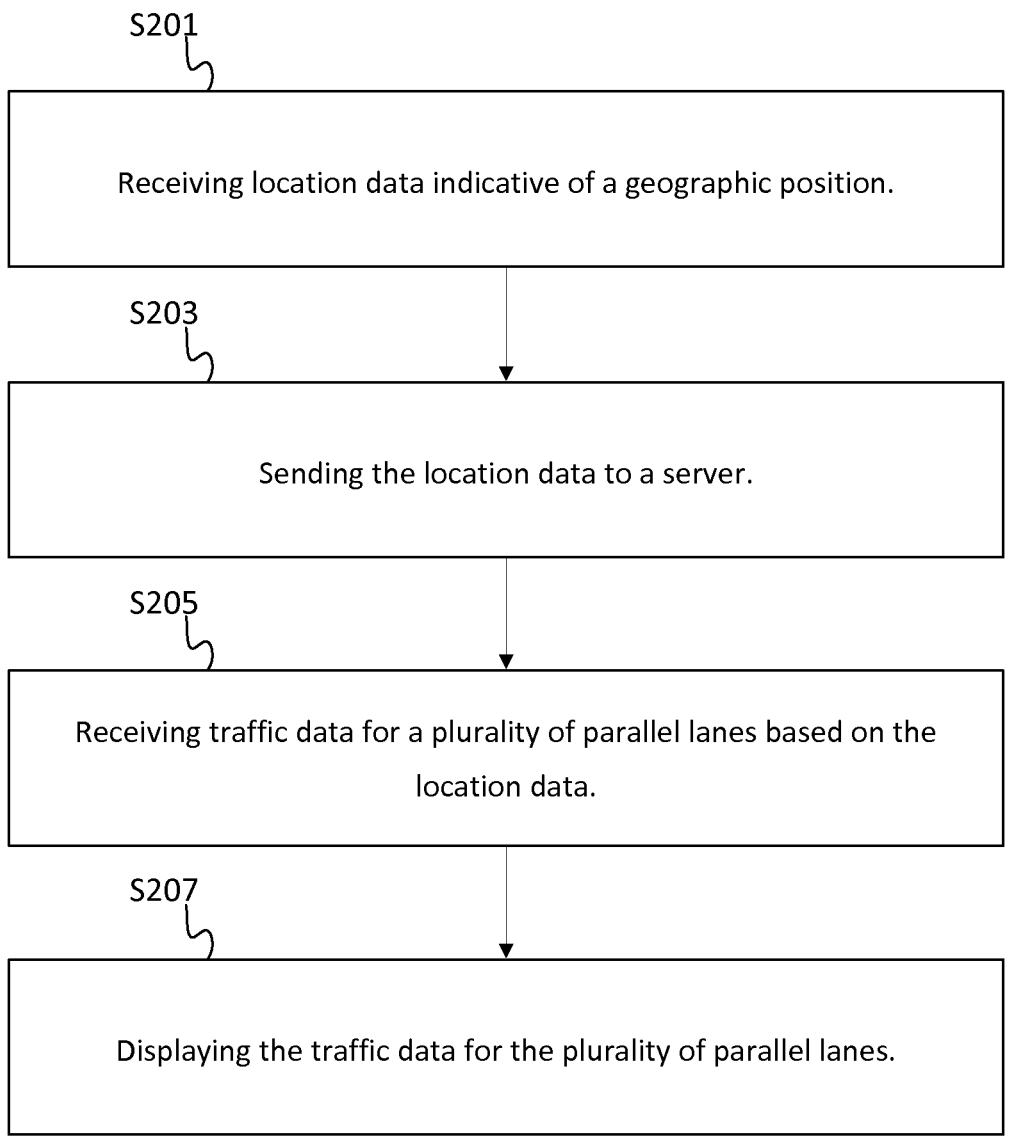
FIG. 10 illustrates another example flowchart for lane level congestion splitting.

FIG. 9 illustrates an exemplary mobile device of the system of FIG. 1. The mobile device 122 may be referred to as a navigation device. The mobile device 122 includes a controller 200, a memory 201, an input device 203, a communication interface 205, position circuitry 207, and a display 211. The workstation 128 may include at least a memory and processor and may be substituted for the mobile device in the following. FIG. 10 illustrates an example flowchart for lane level congestion splitting. The acts of FIG. 10 may be performed by the mobile device 122 or another device. Additional, different, or fewer acts may be provided.

At act S201, the processor 200 receives location data indicative of a geographic position. The location data may be received from position circuitry 207. The location data may include street addresses, geographic coordinates, or another indicator of position.

At act S203, the communication interface 205 sends the location data to the server 125. As described above, the server 125 calculates traffic data for parallel lanes based on the location data. The server 125 may calculate traffic data for one lane directly from the location data and traffic data for another lane based on the traffic data for the first lane and a historical relationship between the two lanes. Thus, the traffic data for at least one of the parallel lanes is based on a combination of current traffic measurements and historic traffic measurements At act S205, the communication interface 205 is configured to receive the traffic data for multiple parallel lanes. At act S207, the processor generates a display (e.g., a map or a street view) that includes the traffic data for the multiple lanes. The display may include different colors, shadings, or other graphical indicators that correspond to ranges for the traffic values.

In addition or the alternative to traffic reporting, the traffic values may be used to provide functions for an autonomous vehicle. An autonomous vehicle is self-driving and may be referred to as a robot vehicle or an automated vehicle. The autonomous vehicle may include passengers but no driver is necessary. The mobile device 122 or another computer system in communication with the mobile device 122 may include instructions for routing the vehicle or operating the vehicle. An estimated travel time may be calculated based on the traffic values and a route may be chosen based on the estimate travel time. The computing system may generate driving commands for steering the vehicle, shifting gears, increasing and decreasing the throttle, and braking. The computing system may generate auxiliary commands for controlling the headlights, turn signals, windshield wipers, defrost, or other auxiliary functions not directly related to the movement of the vehicle.

The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

The database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include GPS, Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, at a mobile device, location data indicative of a geographic position of the mobile device;
   sending the location data to a server;
   receiving, at the mobile device, traffic data for a plurality of parallel lanes based on the location data, wherein the traffic data for at least one of the parallel lanes is based on a combination of current traffic measurements and historic traffic measurements; and
   providing, at the mobile device, the traffic data for the plurality of parallel lanes.

2. The method of claim 1, wherein the traffic data includes a traffic value for each of the parallel lanes.

3. The method of claim 2, further comprising:
   identifying a graphical indicator for the traffic value for each of the parallel lanes.

4. The method of claim 1, wherein the traffic data includes real time data for only a first lane of the parallel lanes and historical data for both the first lane and a second lane of the parallel lanes.

5. The method of claim 4, wherein the historical data includes a ratio between historical traffic levels for the first lane and historical traffic levels for the second lane.

6. The method of claim 1, wherein the traffic data is received through a traffic message channel broadcast.

7. The method of claim 1, wherein the traffic data includes a road segment identification value.

8. The method of claim 1, wherein the plurality of parallel lanes includes an exit ramp lane and a through lane, a first traffic level of the traffic data corresponds to the exit ramp lane, and a second traffic level of the traffic data corresponds to the through lane.

9. The method of claim 1, wherein the plurality of parallel lanes includes a forked route.

10. The method of claim 1, where the traffic data includes at least two traffic levels.

11. The method of claim 1, wherein the plurality of parallel lanes have a common upstream road segment.

12. The method of claim 1, wherein the geographic position is a location of a vehicle including the mobile device and traveling on one of the plurality of parallel lanes.

13. A mobile device comprising:
   at least one processor; and
   at least one non-transitory memory including computer program code for one or more programs; the at least one non-transitory memory and the computer program code configured to, with the at least one processor, cause the apparatus to at least perform:
   receiving location data indicative of a geographic position of the mobile device;
   sending the location data to a server; and
   receiving, at the mobile device, traffic data for a plurality of parallel lanes based on the location data, wherein the traffic data for at least one of the parallel lanes is based on a combination of current traffic measurements and historic traffic measurements.

14. The apparatus of claim 13, the at least one memory and the computer program code configured to, with the at least one processor, cause the apparatus to at least perform:
   generating data for display of the traffic data for the plurality of parallel lanes.

15. The apparatus of claim 13, wherein the traffic data includes a traffic value for each of the parallel lanes.

16. The apparatus of claim 13, wherein the traffic data includes real time data for only a first lane of the parallel lanes and historical data for both the first lane and a second lane of the parallel lanes.

17. The apparatus of claim 13, wherein the historical data includes a ratio between historical traffic levels for the first lane and historical traffic levels for the second lane.

18. The apparatus of claim 13, wherein the plurality of parallel lanes includes an exit ramp lane and a through lane, a first traffic level of the traffic data corresponds to the exit ramp lane, and a second traffic level of the traffic data corresponds to the through lane.

19. A method comprising:
- receiving, at a mobile device, location data indicative of a geographic position;
- sending the location data to a server;
- receiving, at the mobile device, traffic data for a plurality of parallel lanes based on the location data, wherein the traffic data for at least one of the parallel lanes is based on a combination of current traffic measurements for a first lane of the plurality of parallel lanes and historic traffic measurements for a second lane of the plurality of parallel lanes, wherein the first lane and the second lane are adjacent; and
- providing the traffic data for the plurality of parallel lanes.

* * * * *